United States Patent
Wang et al.

(10) Patent No.: US 12,539,507 B2
(45) Date of Patent: Feb. 3, 2026

(54) CATALYST FOR OXIDATIVE CARBONYLATION OF METHANOL TO SYNTHESIZE DIMETHYL CARBONATE, AND PREPARATION METHOD AND APPLICATIONS THEREOF

(71) Applicant: CHENGDU ORGANIC CHEMISTRY CO., LTD., CHINESE ACADEMY OF SCIENCES, Chengdu (CN)

(72) Inventors: Gongying Wang, Chengdu (CN); Mingyu Cao, Chengdu (CN); Yuansheng Bai, Chengdu (CN); Qingyin Wang, Chengdu (CN); Yi Zeng, Chengdu (CN)

(73) Assignee: CHENGDU ORGANIC CHEMISTRY CO., LTD., CHINESE ACADEMY OF SCIENCES, Chengdu (CN)

( * ) Notice: Subject to any disclaimer, the term of this patent is extended or adjusted under 35 U.S.C. 154(b) by 668 days.

(21) Appl. No.: 17/956,073

(22) Filed: Sep. 29, 2022

(65) Prior Publication Data

US 2023/0321641 A1 Oct. 12, 2023

Related U.S. Application Data

(63) Continuation of application No. PCT/CN2022/098909, filed on Jun. 15, 2022.

(30) Foreign Application Priority Data

Apr. 6, 2022 (CN) .......................... 202210380086.X

(51) Int. Cl.
*B01J 31/12* (2006.01)
*B01J 23/72* (2006.01)

(52) U.S. Cl.
CPC ............. *B01J 31/121* (2013.01); *B01J 23/72* (2013.01)

(58) Field of Classification Search
CPC ................................ B01J 31/121; B01J 23/72
See application file for complete search history.

(56) References Cited

FOREIGN PATENT DOCUMENTS

| CN | 104888830 A | * | 9/2015 | |
|---|---|---|---|---|
| CN | 106179440 A | * | 12/2016 | ............ B01J 37/082 |

* cited by examiner

*Primary Examiner* — Yong L Chu
(74) *Attorney, Agent, or Firm* — HOWARD M COHN and Associates, LLC

(57) ABSTRACT

A catalyst for oxidative carbonylation of methanol to obtain dimethyl carbonate, a preparation method and applications thereof are disclosed. The catalyst includes a carrier being a porous carbon-nitrogen material, and an active component being Cu, where the weight of Cu accounts for 5-15 wt % of the total weight of the catalyst. The catalyst exhibits good catalytic activity in the reaction of methanol oxidative carbonylation to synthesize dimethyl carbonate, has high space-time yield and selectivity, and the catalyst and the product are easy to separate.

11 Claims, 1 Drawing Sheet

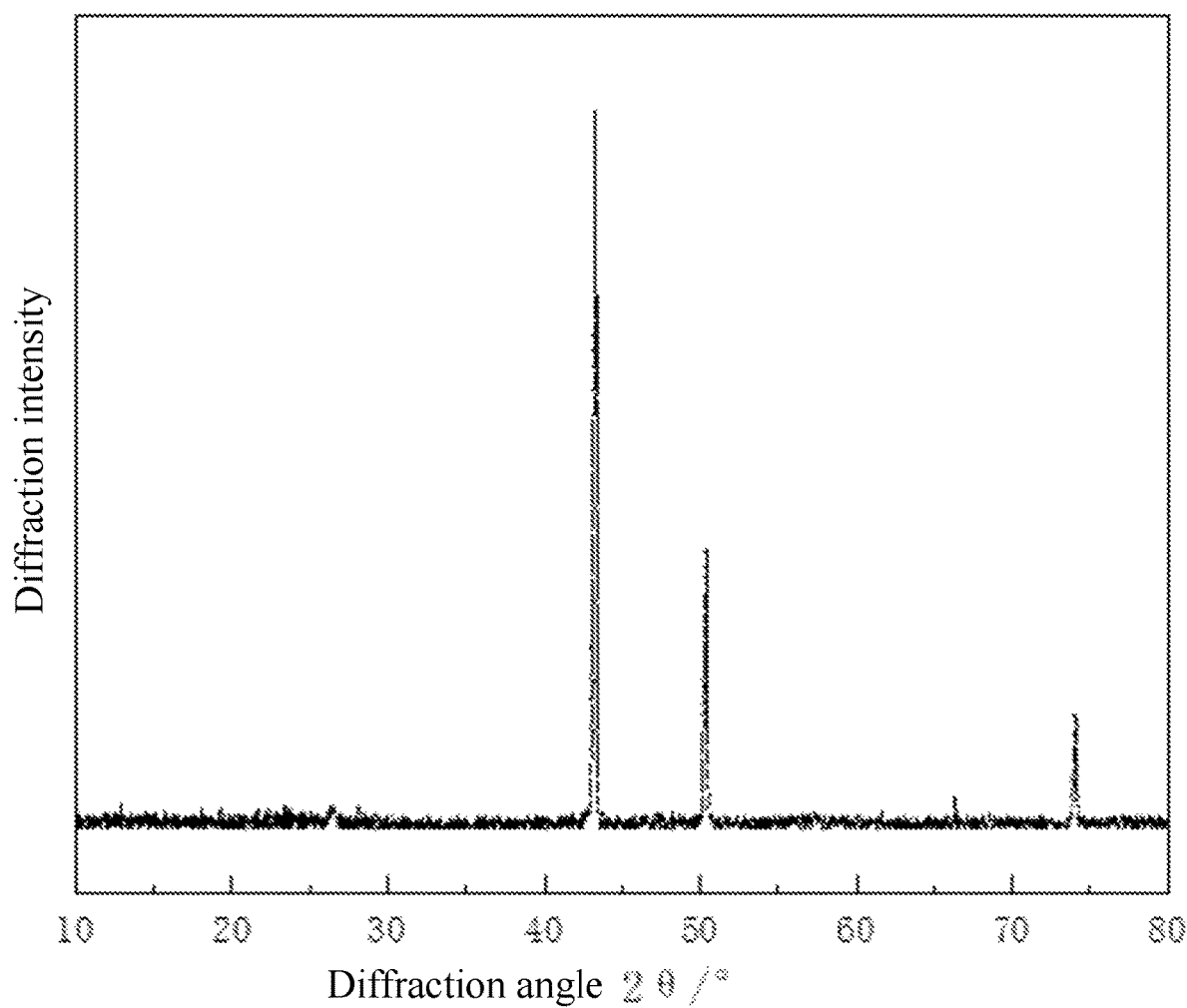

CATALYST FOR OXIDATIVE CARBONYLATION OF METHANOL TO SYNTHESIZE DIMETHYL CARBONATE, AND PREPARATION METHOD AND APPLICATIONS THEREOF

CROSS-REFERENCE TO RELATED APPLICATIONS

This application is a continuation of co-pending International Patent Application Number PCT/CN2022/098909, filed on Jun. 15, 2022, the disclosure of which is incorporated herein by reference in its entirety.

TECHNICAL FIELD

This disclosure relates to the technical field of catalyst preparation, and more particularly relates to a catalyst used for oxidative carbonylation of methanol to synthesize dimethyl carbonate, and a preparation method and applications thereof.

BACKGROUND

Dimethyl carbonate has excellent environmental protection performance with a structural formula of $CH_3OCOOCH_3$, which is an important, low-toxic, biodegradable and environmentally friendly green chemical product. Nowadays, dimethyl carbonate is mainly used in the synthesis of polycarbonate and used as an electrolyte solvent for lithium batteries. In terms of polycarbonate, dimethyl carbonate is used as a raw material to produce PC by non-phosgene method, which is very popular due to its green environmental protection property. With the rapid development of lithium-ion batteries, dimethyl carbonate has been used as an electrolyte solvent for lithium-ion batteries due to its superior properties. Dimethyl carbonate is widely used as a green solvent in coatings, adhesives, and developing solutions, as a gasoline additive to adjust octane number, oxygen content, and freezing point, and as a carbonylation reagent for the synthesis of pesticides and pharmaceutical intermediates.

There are five primary methods for synthesizing dimethyl carbonate. The first is the direct synthesis based on $CO_2$ and methanol, the second is the transesterification method, the third is the phosgene method, and the fourth is the urea alcoholys is method. The fifth is the oxidative carbonylation of methanol. In this method, cheap and easily available methanol, CO and $O_2$ are used as raw materials to synthesize dimethyl carbonate under the action of a catalyst. It can be seen from the equation that theoretically methanol can be converted into dimethyl carbonate by 100%, the atomic utilization rate of the raw material is very high, and in addition to the generation of dimethyl carbonate, only water is generated, so it is harmless to the environment. The liquid-phase methanol oxidative carbonylation to prepare dimethyl carbonate avoids the use of toxic substances such as phosgene and NO. The raw materials are abundant and readily available, the atomic utilization rate is as high as 84.3%, the process is simple, the process is short, and it is economical and environmentally friendly.

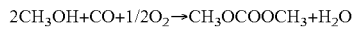

$$2CH_3OH + CO + 1/2O_2 \rightarrow CH_3OCOOCH_3 + H_2O$$

There are three main types of catalysts for the oxidative carbonylation of methanol to synthesize dimethyl carbonate. The first type is selenium-based catalysts, which are mainly divided into selenium or selenium powder, which requires pyridine as a co-catalyst in the catalytic process, but the cost of selenium powder is relatively expensive and it is highly toxic, which limits its use. The second type is palladium-based catalysts, mainly including palladium chloride, palladium nitrate, etc. Palladium-based compounds, as catalysts, also need co-catalysts, which mainly include copper compounds and amine compounds. The third type is the compounds of metallic copper, which can be divided into homogeneous catalysts and heterogeneous catalysts.

Copper-based catalysts are inexpensive and exhibit excellent catalytic activity in the reaction, which has become the focus of research. At present, in view of the shortcomings of copper-based catalysts, relevant scholars have studied the related modification technologies of copper-based catalysts, mainly by adding auxiliary agents or ligands such as o-phenanthroline, N-methylimidazole, etc., which can improve the catalytic activity and reaction stability of the catalyst based on the copper compound. In addition, the corrosiveness of the copper-based catalyst modified by adding auxiliary agents or ligands to equipment is reduced. From the perspective of the reaction system, these homogeneous catalysts are in a homogeneous system with the reactants and products, and the activity and selectivity of the catalysts are high, but the loss of $Cl^-$ is serious, the corrosiveness is significant, and the catalysts in this system are not easy to recover, and the cost of separating the catalyst and the product is high.

Patent CN105293484A uses nitrogen-doped graphene-loaded copper nanocrystals as catalyst to catalyze the oxidative carbonylation of methanol to synthesize dimethyl carbonate. The catalyst has good stability, but the raw materials are expensive and the catalyst activity is low, and the space-time yield is only 3 g/(g·h).

SUMMARY

It is therefore an object of the present disclosure to provide a catalyst for the oxidative carbonylation of methanol to synthesize dimethyl carbonate, and a preparation method and applications thereof. In particular, a heterogeneous solid catalyst prepared with a porous carbon-nitrogen material as a carrier and a copper salt as an active component precursor shows superior catalytic activity in the oxidative carbonylation of methanol to synthesize dimethyl carbonate, and has a high space-time yield and selectivity, and the catalyst and product are easy to separate.

The present disclosure is implemented through the following technical solutions.

There is provided a catalyst for oxidative carbonylation of methanol to prepare dimethyl carbonate, where the carrier of the catalyst is nitrogen-doped hirarchical porous carbon, and the active component is Cu; and the weight of Cu in the catalyst accounts for 5-15 wt % of the total weight of the catalyst.

In some embodiments, the active component Cu in the catalyst is derived from copper sulfate, copper chloride, copper nitrate, and cuprous chloride.

In some embodiments, the active component Cu in the catalyst is derived from cuprous chloride and cupric nitrate.

The present disclosure further provides a method for preparing the catalyst for synthesizing dimethyl carbonate by oxidative carbonylation of methanol, comprising the following operations:

(1) Preparation of nitrogen-doped hirarchical porous carbon: the carrier porous carbon-nitrogen material is obtained by mixing and calcining cellulose powder, ammonium oxalate, and sodium bicarbonate with a mass ratio of 1:(1-

6):(1-6) in a nitrogen atmosphere at 700-900° C. for 1 h; after the calcination is completed, it is cooled to room temperature, the obtained black solid is dispersed in deionized water, washed and filtered until the solution is neutral, and then the obtained black solid material is dried to obtain nitrogen-doped hirarchical porous carbon (NHPC);

(2) Preparation of the copper-based catalyst carried by the NHPC: the preparation of the copper-based catalyst carried by the NHPC is as follows: dissolving the copper salt in concentrated hydrochloric acid, adding deionized water, adding the porous carbon-nitrogen material obtained in operation (1) into the above solution, mixing and stirring sufficiently, separating and vacuum-drying a black solid, and calcining it in a reducing furnace under a 10% $H_2/N_2$ atmosphere at 100-600° C. for 1-5 h, and cooling it to obtain a copper-based catalyst carried by porous carbon-nitrogen material.

In some embodiments, the preparation method of the catalyst for the oxidative carbonylation of methanol to synthesize dimethyl carbonate comprises the following operations:

(1) Preparation of NHPC

Specifically: take cellulose powder, ammonium oxalate, and sodium bicarbonate with a mass ratio of 1:(1-6):(1-6) and mix them, fully grind them evenly, and then put them into a tube furnace for carbonization. During the calcination, the flow rate of $N_2$ was 80 mL/min, and the temperature is programmed to rise to (700-900) ° C. at a heating rate of 10° C./min for 1 h. After calcination, they are cooled to room temperature, and the obtained black solid was dispersed in deionized water. After fully stirring at room temperature for 24 h, the solution is washed with deionized water and suction filtered until the solution becomes neutral. Then, the obtained black solid material is put into a vacuum oven to dry for 6 h, and after being taken out, a porous carbon-nitrogen material is obtained without grinding, which is denoted as NHPC.

(2) Preparation of the copper-based catalyst carried by the porous carbon-nitrogen material, specifically: dissolving the copper salt in concentrated hydrochloric acid, adding deionized water, and then adding the porous carbon-nitrogen material obtained in operation (1) to the above solution. After proper stirring, sonication is performed for 1 h to ensure adequate mixing of the porous carbon-nitrogen material and the Cu solution. Then, after stirring the solution at room temperature for 10 h, the black solid obtained by rotary evaporation of the mixture is vacuum-dried for 3 h, and then fully ground, and then transferred to a reduction furnace for calcination. During the calcination process, the gas atmosphere is 10% $H_2/N_2$, the gas flow rate is 40 mL/min, and the temperature is programmed to rise to 100-600° C. at a heating rate of 4° C./min and they are calcined for 1-5 h. After the reduction is completed, the original atmosphere is maintained and they are allowed to cool to room temperature, and after being taken out, a copper-based catalyst carried by a porous carbon-nitrogen material is obtained without grinding.

The present disclosure further provides an application of the aforementioned catalyst in the oxidative carbonylation of methanol to synthesize dimethyl carbonate. In some embodiments of the present disclosure, the conversion rate of methanol in the above-mentioned oxidative carbonylation of methanol to synthesize dimethyl carbonate reaches 13.4%, the selectivity of dimethyl carbonate reaches 94.8%, and the space-time yield reaches 14.5-22.1 g/(g·h).

The disclosure provides a method for preparing dimethyl carbonate. The method comprises: adding methanol and the catalyst into an autoclave, replacing the air in the reaction kettle with CO, and then filling CO and $O_2$ in sequence, wherein $CO:O_2$=9:1 (volume ratio), the total pressure is 4.0 MPa, and after reacting at 120° C. for 0.5 h, it is cooled in a water bath, and the obtained reaction liquid is separated from the solid catalyst to obtain a clear liquid to realize the reaction synthesis.

The present disclosure has the following beneficial effects.

The disclosure provides a heterogeneous solid catalyst, which uses porous carbon-nitrogen material as a carrier and Cu as an active component, and adopts an impregnation method to prepare the catalyst. The porous carbon-nitrogen material containing N atoms has a moderate coordination strength with $Cu^+$ ions, which not only ensures the stability of $Cu^+$ but also maintains the high catalytic activity of $Cu^+$, and also improves the stability of the catalyst and avoids the loss of active components during the reaction process. At the same time, the catalyst can also maintain a high contact area with the gas raw materials CO and $O_2$ while ensuring good dispersibility. In particular, the catalyst loading, calcination time and dosage can be adjusted to improve the performance index of the catalyst and increase the conversion rate of methanol and the selectivity of producing dimethyl carbonate.

This technology successfully overcomes the disadvantages of difficultly of catalyst recovery and high separation cost in homogeneous catalyst systems. The catalyst raw material provided by the disclosure is a heterogeneous catalyst prepared from low-cost cellulose, which mere requires centrifugation after the reaction, and the product can be easily separated.

BRIEF DESCRIPTION OF ACCOMPANYING DRAWINGS

FIG. 1 shows an X-ray diffraction pattern of a copper-based catalyst carried by a porous carbon-nitrogen material, where the ordinate in the figure represents the diffraction intensity, the abscissa represents the diffraction angle 2 θ, and the standard peaks 43°, 50°, and 73.9° are the characteristic diffraction peaks of copper element. It can be seen from the figure that the copper species is well supported on the carrier. The catalyst uses CuCl as the active component precursor, and the characteristic diffraction peaks of CuCl almost completely disappear, indicating that CuCl is well and highly dispersed on the surface of the carrier.

DETAILED DESCRIPTION

In order to make the purpose, technical solutions and advantages of the present application more clearly understood, the present application will be described in further detail below with reference to the accompanying drawings and embodiments. It should be understood that the specific embodiments described herein are merely used to explain the present application, rather than limit the present application.

The raw materials used in the specific embodiments of the present disclosure are commercially available.

Embodiment 1

In this embodiment, regarding the catalyst used for the oxidative carbonylation of methanol to synthesize dimethyl carbonate, the carrier of the catalyst is a porous carbon-nitrogen material, and the active component is copper.

(1) Catalyst Preparation

Weigh 6 g of cellulose powder, 18 g of ammonium oxalate, and 18 g of sodium bicarbonate, and mix and grind them uniformly, and then transfer them to a tube furnace for calcination. During the calcination, the flow rate of $N_2$ is 80 mL/min, and the temperature is programmed to rise to 800° C. at a heating rate of 10° C./min for 1 h.

At the end of calcination, the obtained black solid is dispersed in 1000 mL of deionized water, fully stirred at room temperature for 24 h, washed with deionized water and suction-filtered until the solution becomes neutral, and then the obtained black solid material is put into a 75° C. vacuum oven for drying, and after drying for 6 h, the porous carbon-nitrogen material is obtained without grinding.

Dissolve 0.169 g of CuCl in 15 mL of concentrated hydrochloric acid, add 45 mL of deionized water, and then add 2.0 g of porous carbon-nitrogen material ensuring that the mass fraction of Cu is 5%. After appropriate stirring, the solution is sonicated for 1 h, then the solution is stirred at room temperature for 10 h, and the mixture is rotary evaporated to obtain a black solid.

The black solid is dried in a vacuum oven at 75° C. for 3 h, then fully ground, and then transferred to a reduction furnace for calcination. During the calcination, the gas atmosphere is 10% $H_2/N_2$, and the gas flow rate is 40 mL/min. and the temperature is programmed to rise to 300° C. at a heating rate of 4° C./min for 2 h. After the reduction is completed, the original atmosphere is maintained and it is allowed to cool to room temperature to obtain 5 wt % Cu/NHPC-300-2.

(2) Catalyst Application 10 mL of methanol and 0.3 g of the prepared 5 wt % Cu/NHPC-300-2 catalyst are added to a 100 mL autoclave. After replacing the air in the autoclave with CO, 3.6 MPa CO and 0.4 MPa $O_2$ were charged in turn. After reacting at 120° C. for 0.5 h, it is cooled in a water bath, and the obtained reaction liquid is separated from the solid catalyst to obtain a clear liquid.

(3) Analysis of Results

The product is analyzed by gas chromatography using ethanol as the internal standard. Analysis results of methanol conversion, space-time yield, and dimethyl carbonate selectivity are as follows:

| Conv. MeOH(%) | $S_{DMC}$(%) | $S_{DMM}$(%) | STY(g/(g · h)) |
| --- | --- | --- | --- |
| 13.38 | 94.79 | 3.44 | 18.8 |

Embodiment 2

(1) Catalyst Preparation

Weight 6 g of cellulose powder, 18 g of ammonium oxalate, and 18 g of sodium bicarbonate and grind them evenly, and then transfer them to a tube furnace for calcination. During the calcination, the flow rate of $N_2$ is 80 mL/min, and the temperature is programmed to rise to 800° C. at a heating rate of 10° C./min for 1 h.

After the calcination is completed, the obtained black solid is dispersed in 1000 mL of deionized water, fully stirred at room temperature for 24 h, washed with deionized water and suction-filtered until the solution becomes neutral. Then, the obtained black solid material is dried in a vacuum oven at 75° C. for 6 h, and the porous carbon-nitrogen material is obtained without grinding after taking it out.

Dissolve 0.369 g of CuCl in 15 mL of concentrated hydrochloric acid, add 45 mL of deionized water, and then add 2.0 g of porous carbon-nitrogen material ensuring that the mass fraction of Cu is 10%. After appropriate stirring, the solution is sonicated for 1 h, then the solution is stirred at room temperature for 10 h, and the mixture is rotary evaporated to obtain a black solid.

The black solid is dried in a vacuum oven at 75° C. for 3 h. After fully grinding, it is transferred to a reduction furnace for calcination. During the calcination, the gas atmosphere is 10% $H_2/N_2$, and the gas flow rate is 40 mL/min. and the temperature is programmed to rise to 300° C. at a heating rate of 4° C./min for 2 h. After the reduction is completed, the original atmosphere is maintained and it is allowed to cool to room temperature to obtain 10 wt % Cu/NHPC-300-2.

(2) Catalyst Application 10 mL of methanol and 0.3 g of the prepared 10 wt % Cu/NHPC-300-2 catalyst are added to a 100 mL autoclave. After replacing the air in the autoclave with CO, 3.6 MPa CO and 0.4 MPa $O_2$ were charged in turn. After reacting at 120° C. for 0.5 h, it is cooled in a water bath, and the obtained reaction liquid is separated from the solid catalyst to obtain a clear liquid.

(3) Analysis of Results

The product is analyzed by gas chromatography using ethanol as the internal standard. Analysis results of methanol conversion, space-time yield, and dimethyl carbonate selectivity are as follows:

| Conv. MeOH(%) | $S_{DMC}$(%) | $S_{DMM}$(%) | STY(g/(g · h)) |
| --- | --- | --- | --- |
| 12.66 | 93.75 | 4.89 | 17.6 |

Embodiment 3

(1) Catalyst Preparation

Weight 6 g of cellulose powder, 18 g of ammonium oxalate, and 18 g of sodium bicarbonate and grind them evenly, and then transfer them to a tube furnace for calcination. During the calcination, the flow rate of $N_2$ is 80 mL/min, and the temperature is programmed to rise to 800° C. at a heating rate of 10° C./min for 1 h.

After the calcination is completed, the obtained black solid is dispersed in 1000 mL of deionized water, fully stirred at room temperature for 24 h, washed with deionized water and suction-filtered until the solution becomes neutral. Then, the obtained black solid material is dried in a vacuum oven at 75° C. for 6 h, and the porous carbon-nitrogen material is obtained without grinding after taking it out.

Dissolve 0.61 g of CuCl in 15 mL of concentrated hydrochloric acid, add 45 mL of deionized water, and then add 2.0 g of NHPC ensuring that the mass fraction of Cu is 15%. After appropriate stirring, the solution is sonicated for 1 h, then the solution is stirred at room temperature for 10 h, and the mixture is rotary evaporated to obtain a black solid.

The black solid is dried in a vacuum oven at 75° C. for 3 h. After fully grinding, it is transferred to a reduction furnace for calcination. During the calcination, the gas atmosphere is 10% $H_2/N_2$, and the gas flow rate is 40 mL/min. and the temperature is programmed to rise to 300° C. at a heating rate of 4° C./min for 2 h. After the reduction is completed, the original atmosphere is maintained and it is allowed to cool to room temperature to obtain 15 wt % Cu/NHPC-300-2.

(2) Catalyst Application 10 mL of methanol and 0.3 g of the prepared 15 wt % Cu/NHPC-300-2 catalyst are added to a 100 mL autoclave. After replacing the air in the autoclave with CO, 3.6 MPa CO and 0.4 MPa $O_2$ were charged in turn. After reacting at 120° C. for 0.5 h, it is cooled in a water bath, and the obtained reaction liquid is separated from the solid catalyst to obtain a clear liquid.

(3) Analysis of Results

The product is analyzed by gas chromatography using ethanol as the internal standard. Analysis results of methanol conversion, space-time yield, and dimethyl carbonate selectivity are as follows:

| Conv. MeOH(%) | $S_{DMC}$(%) | $S_{DMM}$(%) | STY(g/(g · h)) |
|---|---|---|---|
| 11.04 | 92.63 | 5.77 | 16.1 |

Embodiment 4

(1) Catalyst Preparation

Weight 6 g of cellulose powder, 18 g of ammonium oxalate, and 18 g of sodium bicarbonate and grind them evenly, and then transfer them to a tube furnace for calcination. During the calcination, the flow rate of $N_2$ is 80 mL/min, and the temperature is programmed to rise to 800° C. at a heating rate of 10° C./min for 1 h.

After the calcination is completed, the obtained black solid is dispersed in 1000 mL of deionized water, fully stirred at room temperature for 24 h, washed with deionized water and suction-filtered until the solution becomes neutral. Then, the obtained black solid material is dried in a vacuum oven at 75° C. for 6 h, and the porous carbon-nitrogen material is obtained without grinding after taking it out.

Dissolve 0.61 g of CuCl in 15 mL of concentrated hydrochloric acid, add 45 mL of deionized water, and then add 2.0 g of NHPC ensuring that the mass fraction of Cu is 15%. After appropriate stirring, the solution is sonicated for 1 h, then the solution is stirred at room temperature for 10 h, and the mixture is rotary evaporated to obtain a black solid.

The black solid is dried in a vacuum oven at 75° C. for 3 h. After being thoroughly ground, it is transferred to a reduction furnace for calcination. During the calcination, the gas atmosphere is 10% $H_2/N_2$, and the gas flow rate is 40 mL/min. and the temperature is programmed to rise to 300° C. at a heating rate of 4° C./min for 3 h. After the reduction is completed, the original atmosphere is maintained and it is allowed to cool to room temperature to obtain 15 wt % Cu/NHPC-300-3.

(2) Catalyst Application 10 mL of methanol and 0.3 g of the prepared 15 wt % Cu/NHPC-300-3 catalyst are added to a 100 mL autoclave. After replacing the air in the autoclave with CO, 3.6 MPa CO and 0.4 MPa $O_2$ were charged in turn. After reacting at 120° C. for 0.5 h, it is cooled in a water bath, and the obtained reaction liquid is separated from the solid catalyst to obtain a clear liquid.

(3) Analysis of Results

The product is analyzed by gas chromatography using ethanol as the internal standard. Analysis results of methanol conversion, space-time yield, and dimethyl carbonate selectivity are as follows:

| Conv. MeOH(%) | $S_{DMC}$(%) | $S_{DMM}$(%) | STY(g/(g · h)) |
|---|---|---|---|
| 10.96 | 92.32 | 6.57 | 14.5 |

Embodiment 5

(1) Catalyst Preparation

Weight 6 g of cellulose powder, 18 g of ammonium oxalate, and 18 g of sodium bicarbonate and grind them evenly, and then transfer them to a tube furnace for calcination. During the calcination, the flow rate of $N_2$ is 80 mL/min, and the temperature is programmed to rise to 800° C. at a heating rate of 10° C./min for 1 h.

After the calcination is completed, the obtained black solid is dispersed in 1000 mL of deionized water, fully stirred at room temperature for 24 h, washed with deionized water and suction-filtered until the solution becomes neutral. Then, the obtained black solid material is dried in a vacuum oven at 75° C. for 6 h, and the porous carbon-nitrogen material is obtained without grinding after taking it out.

Dissolve 0.169 g of CuCl in 15 mL of concentrated hydrochloric acid, add 45 mL of deionized water, and then add 2.0 g of NHPC ensuring that the mass fraction of Cu is 5%. After appropriate stirring, the solution is sonicated for 1 h, then the solution is stirred at room temperature for 10 h, and the mixture is rotary evaporated to obtain a black solid.

The black solid is dried in a vacuum oven at 75° C. for 3 h. After being thoroughly ground, it is transferred to a reduction furnace for calcination. During the calcination, the gas atmosphere is 10% $H_2/N_2$, and the gas flow rate is 40 mL/min. and the temperature is programmed to rise to 300° C. at a heating rate of 4° C./min for 2 h. After the reduction is completed, the original atmosphere is maintained and it is allowed to cool to room temperature to obtain 5 wt % Cu/NHPC-300-2.

(2) Catalyst Application 10 mL of methanol and 0.2 g of the prepared 5 wt % Cu/NHPC-300-2 catalyst are added to a 100 mL autoclave. After replacing the air in the autoclave with CO, 3.6 MPa CO and 0.4 MPa $O_2$ were charged in turn. After reacting at 120° C. for 0.5 h, it is cooled in a water bath, and the obtained reaction liquid is separated from the solid catalyst to obtain a clear liquid.

(3) Analysis of Results

The product is analyzed by gas chromatography using ethanol as the internal standard. Analysis results of methanol conversion, space-time yield, and dimethyl carbonate selectivity are as follows:

| Conv. MeOH(%) | $S_{DMC}$(%) | $S_{DMM}$(%) | STY(g/(g · h)) |
|---|---|---|---|
| 10.5 | 94.82 | 3.11 | 22.1 |

Embodiment 6

(1) Catalyst Preparation

Weight 6 g of cellulose powder, 18 g of ammonium oxalate, and 18 g of sodium bicarbonate and grind them evenly, and then transfer them to a tube furnace for calcination. During the calcination, the flow rate of $N_2$ is 80 mL/min, and the temperature is programmed to rise to 800° C. at a heating rate of 10° C./min for 1 h.

After the calcination is completed, the obtained black solid is dispersed in 1000 mL of deionized water, fully stirred at room temperature for 24 h, washed with deionized water and suction-filtered until the solution becomes neutral. Then, the obtained black solid material is dried in a vacuum oven at 75° C. for 6 h, and the NHPC is obtained without grinding after taking it out.

Dissolve 0.8698 g of $Cu(NO_3)_2 \cdot H_2O$ in 60 mL of deionized water, and then add 2.0 g of NHPC ensuring that the mass fraction of Cu is 10%. After appropriate stirring, the solution is sonicated for 1 h, then the solution is stirred at room temperature for 10 h, and the mixture is rotary evaporated to obtain a black solid.

The black solid is dried in a vacuum oven at 75° C. for 3 h. After being thoroughly ground, it is transferred to a reduction furnace for calcination. During the calcination, the gas atmosphere is $N_2$ the gas flow rate is 100 mL/min, and the temperature is programmed to rise to 400° C. at a heating rate of 4° C./min for 2 h. After the calcination is completed, the original atmosphere is maintained and it is allowed to cool to room temperature to obtain 10 wt % CuO/NHPC-400-2.

(2) Catalyst Application 10 mL of methanol and 0.3 g of the prepared 10 wt % CuO/NHPC-400-2 catalyst are added to a 100 mL autoclave. After replacing the air in the autoclave with CO, 3.6 MPa CO and 0.4 MPa $O_2$ were charged in turn. After reacting at 120° C. for 0.5 h, it is cooled in a water bath, and the obtained reaction liquid is separated from the solid catalyst to obtain a clear liquid.

(3) Analysis of Results

The product is analyzed by gas chromatography using ethanol as the internal standard. Analysis results of methanol conversion, space-time yield, and dimethyl carbonate selectivity are as follows:

| Conv. MeOH(%) | $S_{DMC}$(%) | $S_{DMM}$(%) | STY(g/(g · h)) |
|---|---|---|---|
| 10.81 | 95.36 | 2.22 | 15.3 |

From the results in the above examples 1-6, it can be concluded that the copper-based catalyst supported by a porous carbon-nitrogen material provided by the present disclosure catalyzes the oxidative carbonylation of methanol to synthesize dimethyl carbonate with a space-time yield of up to 22.1 g/(g h). In the present disclosure, the conversion rate of methanol and the selectivity of dimethyl carbonate can be adjusted by adjusting the loading amount of active components, the calcination time of the catalyst, and the amount of the catalyst. The prepared catalyst of the present disclosure can be separated from dimethyl carbonate through a simple separation method.

The above description of the disclosed embodiments enables any person skilled in the art to make or use the present disclosure. Various modifications to these embodiments will be readily apparent to those skilled in the art, and the generic principles defined in this disclosure may be implemented in other embodiments without departing from the spirit or scope of this disclosure. Thus, the present disclosure is not intended to be limited to the embodiments of the present disclosure shown, but is to be accorded the widest scope consistent with the principles and novel features disclosed herein.

What is claimed is:

1. A catalyst, comprising:
   a carrier being a nitrogen-doped hierarchical porous carbon (NHPC); and
   an active component being Cu element;
   wherein a weight of Cu in the catalyst accounts for 5-15 wt % of a total weight of the catalyst;
   wherein the NHPC being obtained by mixing cellulose powder, ammonium oxalate, and sodium bicarbonate with a mass ratio of 1:(1-6):(1-6) and calcining at 700-900° C., and
   the copper-based catalyst supported by the NHPC being obtained by dissolving a copper salt in concentrated hydrochloric acid, adding deionized water, adding the porous carbon-nitrogen material obtained in the previous operation into the above solution, mixing and stirring sufficiently, vacuum drying after separation, and calcining in a 10% $H_2/N_2$ atmosphere in a reducing furnace at 100-600° C. for 1-5 h, and cooling to obtain the copper-based catalyst supported by the porous carbon-nitrogen material.

2. The catalyst of claim 1, wherein the active component Cu in the catalyst is derived from copper sulfate, copper chloride, copper nitrate, or cuprous chloride.

3. A method of preparing a catalyst of claim 1, the catalyst comprising a carrier being a NHPC material and an active component being Cu, the method comprising:
   preparation of NHPC material, comprising: mixing cellulose powder, ammonium oxalate, and sodium bicarbonate with a mass ratio of 1:(1-6):(1-6) in nitrogen atmosphere and calcining at 700-900° C. for 1h, after the calcination is finished, cooling to room temperature to obtain a black solid, dispersing the obtained black solid in deionized water, filtering and drying to obtain the NHPC;
   preparation of a copper-based catalyst supported by the NHPC, comprising: dissolving a copper salt in concentrated hydrochloric acid, adding deionized water, adding the porous carbon-nitrogen material obtained in the previous operation into the above solution, mixing and stirring sufficiently, vacuum drying after separation, and calcining in a 10% $H_2/N_2$ atmosphere in a reducing furnace at 100-600° C. for 1-5 h, and cooling to obtain the copper-based catalyst supported by the porous carbon-nitrogen material.

4. The method of claim 3, wherein the copper salt comprises at least one selected from the group consisting of copper sulfate, copper chloride, copper nitrate, and cuprous chloride.

5. The method of claim 3, wherein a weight of Cu in the catalyst accounts for 5-15 wt % of a total weight of the catalyst.

6. A method for synthesizing dimethyl carbonate using methanol oxidative carbonylation, comprising using the catalyst of claim 1.

7. The method of claim 6, wherein a conversion rate of methanol reaches 13.4%, a selectivity of dimethyl carbonate reaches 94.8%, and a space-time yield reaches 14.5-22.1 g/(g·h).

8. The method of claim 6, wherein the porous carbon-nitrogen material of the carrier in the catalyst is obtained by mixing cellulose powder, ammonium oxalate, and sodium bicarbonate with a mass ratio of 1:(1-6):(1-6) and calcining at 700-900° C.

9. The method of claim 6, wherein the active component Cu in the catalyst is derived from copper sulfate, copper chloride, copper nitrate, or cuprous chloride.

10. The method of claim 6, wherein the methanol and the catalyst are added into an autoclave, the air in the autoclave is replaced with CO, then the autoclave is filled CO and $O_2$ in turn, and then cooled in a water bath after the reaction to obtain a reaction liquid, and a solid catalyst is separated from the obtained reaction liquid to obtain dimethyl carbonate.

11. The method of claim 6, wherein a volume ratio of $CO:O_2$ is 9:1, a system pressure is 2-5 MPa, and a reaction temperature is 100-200° C.

* * * * *